(12) United States Patent
Ballester

(10) Patent No.: US 8,424,254 B2
(45) Date of Patent: Apr. 23, 2013

(54) LOADING BAY

(75) Inventor: Miguel Angel Iglesias Ballester, Barcelona (ES)

(73) Assignee: Amiserru, S.L., Barcelona (ES)

( * ) Notice: Subject to any disclaimer, the term of this patent is extended or adjusted under 35 U.S.C. 154(b) by 0 days.

(21) Appl. No.: 13/145,491

(22) PCT Filed: Apr. 1, 2009

(86) PCT No.: PCT/ES2009/000176
§ 371 (c)(1),
(2), (4) Date: Aug. 16, 2011

(87) PCT Pub. No.: WO2010/112619
PCT Pub. Date: Oct. 7, 2010

(65) Prior Publication Data
US 2012/0036791 A1    Feb. 16, 2012

(51) Int. Cl.
*E04D 13/18*    (2006.01)
(52) U.S. Cl.
USPC ............ 52/173.2; 52/173.1; 14/69.5; 14/71.5
(58) Field of Classification Search ................. 52/173.2; 14/69.5, 71.5
See application file for complete search history.

(56) References Cited

U.S. PATENT DOCUMENTS

| | | | | |
|---|---|---|---|---|
| 3,830,384 A | * | 8/1974 | Barber | 414/556 |
| 3,934,380 A | * | 1/1976 | Frommelt et al. | 52/173.2 |
| 4,045,925 A | * | 9/1977 | O'Neal | 52/2.13 |
| 4,843,373 A | * | 6/1989 | Trickle et al. | 340/540 |
| 5,047,748 A | * | 9/1991 | Trickle | 340/542 |
| 5,622,016 A | * | 4/1997 | Frommelt et al. | 52/173.2 |
| 5,675,945 A | * | 10/1997 | Giuliani et al. | 52/173.2 |
| 5,803,701 A | * | 9/1998 | Filiberti et al. | 700/215 |
| 5,927,025 A | * | 7/1999 | Brockman et al. | 52/173.2 |
| 5,953,868 A | * | 9/1999 | Giuliani et al. | 52/173.2 |
| 6,019,567 A | * | 2/2000 | Lutkus et al. | 414/549 |
| 6,329,931 B1 | * | 12/2001 | Gunton | 340/933 |
| 6,425,214 B1 | * | 7/2002 | Boffeli et al. | 52/173.2 |
| 6,634,139 B1 | * | 10/2003 | Metz | 49/13 |
| 6,654,976 B2 | * | 12/2003 | Digmann et al. | 14/69.5 |
| 6,742,979 B1 | * | 6/2004 | Salazar | 414/522 |
| 6,812,849 B1 | * | 11/2004 | Ancel | 340/686.1 |
| 6,854,224 B2 | * | 2/2005 | Thill et al. | 52/173.2 |

(Continued)

FOREIGN PATENT DOCUMENTS

| | | |
|---|---|---|
| CH | 600117 | 6/1978 |
| ES | 1048606 | 9/2001 |

(Continued)

*Primary Examiner* — Joshua J Michener
*Assistant Examiner* — Alp Akbasli
(74) *Attorney, Agent, or Firm* — Leason Ellis LLP

(57) ABSTRACT

This loading bay comprises a compact structure carrying at least one fold-away ramp and a shelter for closing off the space between the shed and the truck box body at the side and at the top during loading or unloading operations. Said compact structure adjoins the wall (P) of the shed on the outside and is set up with the possibility of being removed longitudinally on guide means for positioning the movable assembly in a position opposite any one of the openings (H) providing access to the shed. The loading bay comprises, additionally, motorized actuating means, at least one bar of sensors for detecting the position of the truck while said truck is being moved closer into position, a light-signalling device and a light and/or acoustic signal warning of the approach of a truck.

11 Claims, 5 Drawing Sheets

U.S. PATENT DOCUMENTS

| | | | |
|---|---|---|---|
| 7,185,463 B2 * | 3/2007 | Borgerding | 52/173.2 |
| 7,274,300 B2 * | 9/2007 | Duvernell et al. | 340/686.6 |
| 7,380,375 B2 * | 6/2008 | Maly | 52/173.1 |
| 7,568,877 B1 * | 8/2009 | Nespor | 414/545 |
| 7,980,808 B2 * | 7/2011 | Chilson et al. | 414/809 |
| 8,042,307 B2 * | 10/2011 | Digmann et al. | 52/173.2 |
| 8,100,461 B2 * | 1/2012 | Smith et al. | 296/180.4 |
| 2001/0018813 A1 * | 9/2001 | Ashelin et al. | 52/173.2 |
| 2002/0112418 A1 * | 8/2002 | Thill et al. | 52/173.2 |
| 2002/0124491 A1 * | 9/2002 | Hahn et al. | 52/174 |
| 2003/0140579 A1 * | 7/2003 | Hoffmann et al. | 52/173.2 |
| 2003/0147734 A1 * | 8/2003 | Adams | 414/541 |
| 2003/0177719 A1 * | 9/2003 | Shelton et al. | 52/173.2 |
| 2003/0197622 A1 * | 10/2003 | Reynard et al. | 340/686.1 |
| 2003/0199996 A1 * | 10/2003 | Reynard et al. | 700/17 |
| 2006/0137261 A1 * | 6/2006 | Maly | 52/36.3 |
| 2006/0230681 A1 * | 10/2006 | Appelman | 49/49 |
| 2007/0092365 A1 * | 4/2007 | Filiatreault | 414/491 |
| 2007/0175116 A1 * | 8/2007 | Borgerding | 52/173.2 |
| 2007/0283636 A1 * | 12/2007 | Bernacki et al. | 52/173.2 |
| 2008/0034683 A1 * | 2/2008 | Hoffmann | 52/173.2 |
| 2008/0184503 A1 * | 8/2008 | Andersen et al. | 14/71.3 |
| 2008/0201875 A1 * | 8/2008 | Grunewald | 14/71.3 |
| 2009/0110522 A1 * | 4/2009 | Criswell | 414/398 |
| 2009/0293371 A1 * | 12/2009 | Digmann et al. | 52/2.12 |
| 2010/0058682 A1 * | 3/2010 | Grunewald | 52/173.2 |
| 2010/0266381 A1 * | 10/2010 | Chilson et al. | 414/809 |

FOREIGN PATENT DOCUMENTS

| | | |
|---|---|---|
| ES | 1055593 | 12/2003 |
| WO | WO-03067000 | 8/2003 |
| WO | WO-2007129631 | 11/2007 |

* cited by examiner

LOADING BAY

OBJECT OF THE INVENTION

The present invention refers to a loading bay for industrial premises, of the type which comprise a compact structure carrying at least one fold-away ramp designed to connect the shed and the truck box body, and a shelter for closing off the space between the shed and the truck box body at the side and at the top during loading and unloading operations. It is the fold-away ramp that closes off the assembly at the bottom.

ANTECEDENTS OF THE INVENTION

At present it is common that industrial premises comprise one or more bays for loading and unloading material.

These bays are arranged according to the defined openings in the wall of the shed and include a ramp which outlines an area for trolleys and other loading vehicles between the shed and the truck box body or trailer.

The ramp is generally arranged inside in a pit in which the means of actuating the ramp are located, generally made up of hydraulic cylinders, equipment supplying hydraulic pressure and control means.

These loading bays also comprise, in the external part of the opening, shelters which adapt to the shape of the truck box body, and which close off the space existing between the door of the bay and the truck at the side and at the top. These shelters are permanently exposed to the elements which causes rapid deterioration.

The aforementioned pit presents certain problems for use, among which should be highlighted the need for specific building works, the accumulation of dirt and waste inside, and the fact that dust, insects and even rodents get inside the interior of the shed.

Among the existing antecedents should be highlighted the unloading bay described in the patent application PCT/ES2008/000770 by the holder of the present invention, which presents building specificities aimed at providing a series of advantages such as facilitating installation, occupying minimal space, no need for building work to create a pit, a smooth, continual floor inside the shed, facilitating cleaning and adequate hygienic conditions, providing greater protection to the shelter when the loading bay is not in use, removing problems involving the accumulation of dirt in the installation area of the ramp, enabling the effective closing of the loading bay when not in use, with all operative elements stored inside, and facilitating interconnection between all the openings by joining the structures using tubes through which the pre-installation of the electrical, pneumatic, hydraulic, voice and data connections can be made.

The loading bay of the aforementioned invention comprises mainly a compact structure fixed to the area around the opening to the shed, and which defines an intermediate space between the internal and external sides of the wall for placing the means of shelter and the fold-away ramp, with the possibility of being moved from an operative position in which they protrude from the aforementioned intermediate space toward the exterior to interact with the truck box body or trailer for loading or unloading, and a non-operative position in which they are arranged in the interior of the intermediate space. This compact structure, in contact with the exterior and interior sides of the wall, comprises frames for setting up an exterior closing door on the exterior level of the shed and an interior door, preferably that can be opened rapidly, which closes on the floor or inferior level of the shed. Other relevant characteristics of the aforementioned invention consist of the incorporation of signaling means controlled by sensors which detect the position of the back of the truck in relation to the loading bay. These signaling means provide visual information on the correct or incorrect position of the truck during its approach to the loading bay.

The loading bay described in the aforementioned patent application PCT/ES2008/000770 is especially suitable for installation in new constructions. However, there are a multitude of sheds which only have openings with one closing door, for loading and unloading merchandise, and simply resort to positioning a ramp or similar between the opening and the truck box body to form an area through which the trolleys commonly used in loading and unloading can pass.

In these cases, equipping each opening with a loading bay of the type described in the aforementioned patent application PCT/ES2008/000770 is an optimal solution, but involves a high cost that cannot always be assumed by the client, especially when the number of trucks to load or unload is limited and involves the use of a reduced number of loading bays.

Therefore, the technical problem posed is the development of a loading bay which provides similar features to those described in the patent application PCT/ES2008/000770 by the same holder, but which reduces considerably the investment to be made and enables its use in each and every one of the available openings.

DESCRIPTION OF THE INVENTION

To solve the problem presented, the loading bay which is the object of this invention has been designed. It is of the type described in the aforementioned patent application PCT/ES2008/000770, which means that it is a loading bay that comprises a compact structure carrying at least one fold-away ramp designed to connect the shed and the truck box body, and a shelter for closing off the space between the shed and the truck box body at the side and at the top during loading and unloading operations. It presents construction specificities aimed at enabling its alternative use in different openings in the shed in question, and providing drivers, in one specific use of the invention, with adequate signaling to facilitate maneuvering while the truck approaches the opening in which the loading bay is located or, in another use of the invention, to facilitate maneuvering when the truck approaches a different opening to the one where the loading bay is positioned.

As a result, and in accordance with the invention, the compact structure carrying the fold-away ramp and shelter adjoins the wall of the shed on the outside and is set up with the possibility of being moved longitudinally on guide means for positioning opposite any one of the openings. The loading bay comprises motorized actuating means for the controlled moving of the compact structure on guide means and positioning opposite any one of the openings in the shed.

In one use of the invention, the motorized actuating means of the whole of the installation, as well as the internal closing door, are arranged in the moveable assembly.

It is necessary to highlight that when moving the unit and joining it to the truck to make the closure, the unit also closes off the opening that it has occupied to achieve maximum sealing.

This solution enables all the openings to be serviced successively, through the installation of a single loading bay or a lower number of loading bays in any case than the number of openings, notably reducing the necessary installation costs for a loading bay in each opening.

It should be mentioned that the motorized means for moving the loading bay or bays on the longitudinal guides can be of any type, such as sprocket/rack, traction cable, nut/screw, or any other capable of controlled movement of the structure by the guide means.

With the described configuration of the loading bay of the invention, there is at least one bar of sensors for detecting the position of the truck while said truck is being moved closer to an opening in the shed, and a control device of at least one light-signaling device which provides information for the driver on the position of the truck as it is being moved closer to a specific opening. Similarly, in one use of the invention, the loading bay comprises a light and/or acoustic signal and can detect presence to warn any person nearby that could be in the dangerous area as the truck enters.

In one use of the invention, this bar of sensors is located on the free side of the moveable roof, moving, with the compact structure, along the guide means, and providing the control device associated to the compact structure with the necessary information to activate the light-signaling devices, also associated in this case to the compact structure, to guide the truck driver during the maneuver towards the opening.

As it may be necessary to place another truck in a different opening while the loading bay is in use, while waiting for the loading bay to be available, and in order to facilitate the maneuver to get into a position, a variation in use of the invention has been designed in which the bar of sensors and the light-signaling device are not fixed to the compact structure, but are set up with the possibility of being moved longitudinally on specific longitudinal guide means, for their positioning opposite any one of the openings to the shed and different to that in which the loading bay is located.

This solution provides the driver of this second truck with the appropriate indications and signaling for the correct positioning of the truck in an opening while the loading bay is being used in another opening. In this way, the trucks can position themselves in the free openings, with the help of the light-signaling device which moves, along with the bar of sensors, while the loading bay is being used in a different opening. This leads to optimal use of time in terms of use of the loading bay.

In accordance with the invention, the bar of sensors is illuminated by a suitable light to increase its visibility both at night and in adverse weather conditions.

Taking into account that the loading bay can be used in new constructions as well as existing sheds, which already comprise a closing door for each opening, it can come without a closing door at the back, especially for cases in which the openings already have their own closing door.

For these cases, and, according to one use of the invention, it has been designed so that the sides of the shelter can be made of rigid surface areas which form, in the closed position, a front or external closing door to the loading bay.

When the moveable assembly is in use, it closes the perimeter with the truck and the corresponding opening.

In one use of the invention, the fold-away ramp is set on the compact structure using raising devices which enable it to be moved vertically in relation to the compact structure and adapt in height to vehicles of different types and/or sizes.

According to the invention, on the sides of the surface area making up the area through which trolleys can pass, the fold-away ramp comprises side stops which define the area longitudinally, avoiding possible falls from this area to the exterior level of the shed.

In a first use, the side stops are fixed, maintaining a permanent operative position, while, in a second use, the side stops are set on the fold-away ramp and can turn between an operative position, slightly perpendicular to the surface of the fold-away ramp, and an inoperative position, slightly parallel to the surface of the fold-away ramp. In this second use, the aforementioned side stops will be associated to actuating means which automatically cause them to fall into the inoperative position when the ramp is folded towards the interior of the compact frame, and to fall into the operative position when the ramp is unfolded towards the exterior of the loading bay.

DESCRIPTION OF DIAGRAMS

To complete the description and facilitate understanding of the different features of the invention, the present descriptive report includes a set of illustrative but not limiting diagrams in which the following can be seen:

PREFERENTIAL USE FOR THE INVENTION

Figure 1:
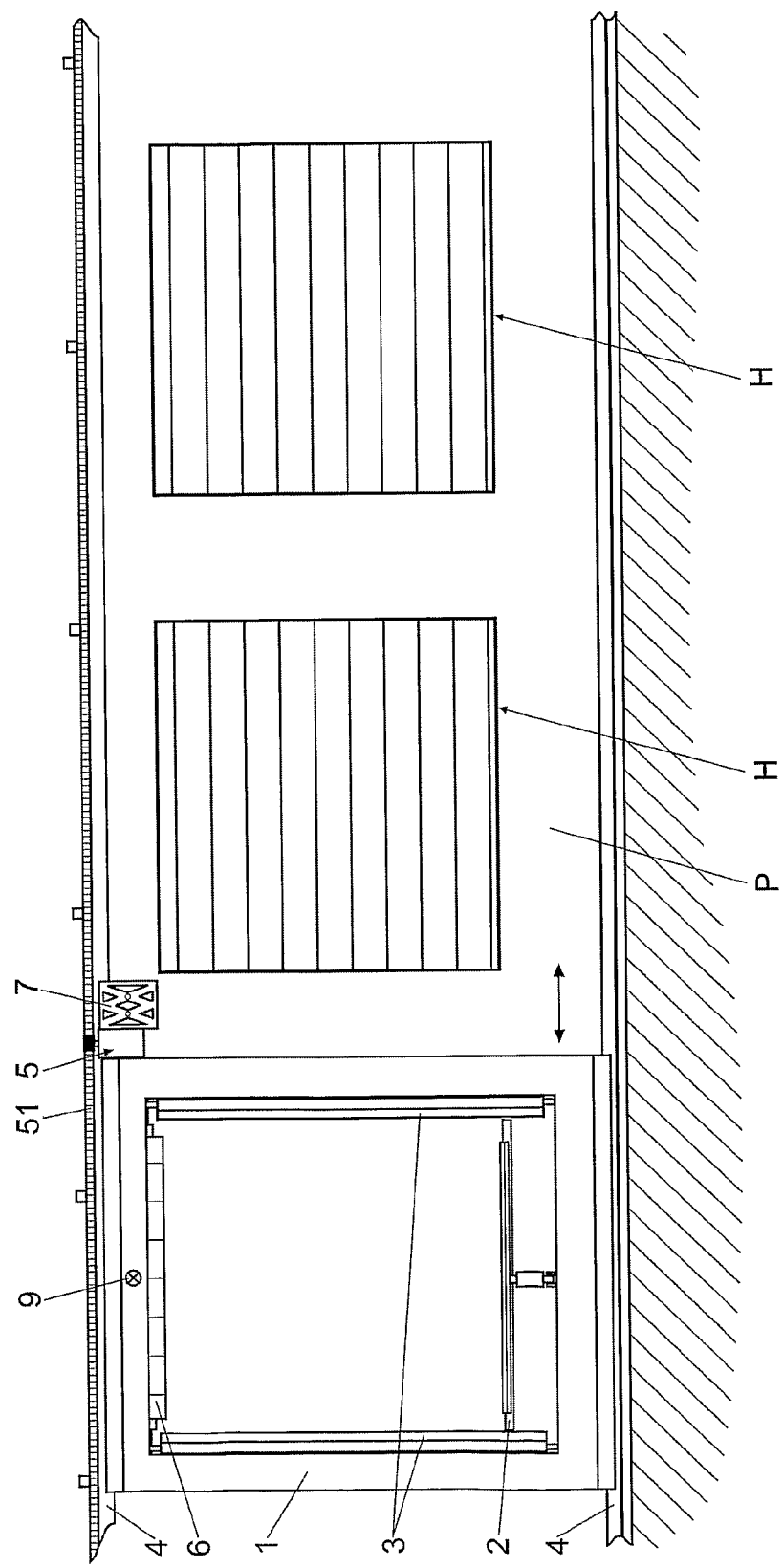
FIG. 1 shows a schematic view from above of an example of use of the loading bay opposite one of the openings to the shed, and with the bar of sensors associated to the moveable assembly formed by the structure, the fold-away ramp and the shelter.

As can be observed in the attached diagrams, the loading bay comprises a compact structure (1) carrying, in this example of use, a fold-away ramp (2) designed to connect the shed and the truck box body for loading and unloading, and a shelter (3) for closing off the space between the shed and the truck box body at the side and at the top during loading or unloading operations.

The compact structure (1) carrying the aforementioned elements and, optionally an internal closing door, not shown in the attached diagrams, adjoins the wall (P) of the shed on the outside and is set up with the possibility of being moved longitudinally on guide means (4) for positioning the movable assembly in a position opposite any one of the openings (H) in the shed.

The displacement of the compact structure (1) by the guides (4) is determined by motorized actuating means (5), which, in the example shown, are represented by a motorized sprocket set on the structure (1), which acts on a rack (51) fixed to the support of the upper guide (4).

The motorized means (5) are controlled by a control panel arranged preferably in the lower area of the structure and not represented in the attached diagrams.

The loading bay comprises, additionally, at least one bar of sensors (6) for detecting the position of the truck while said truck is being moved closer into any of the openings (H), and a control device for light-signaling devices (7) which provides the driver with the necessary information to guide the truck into the correct position opposite the corresponding opening (H).

Figure 2:
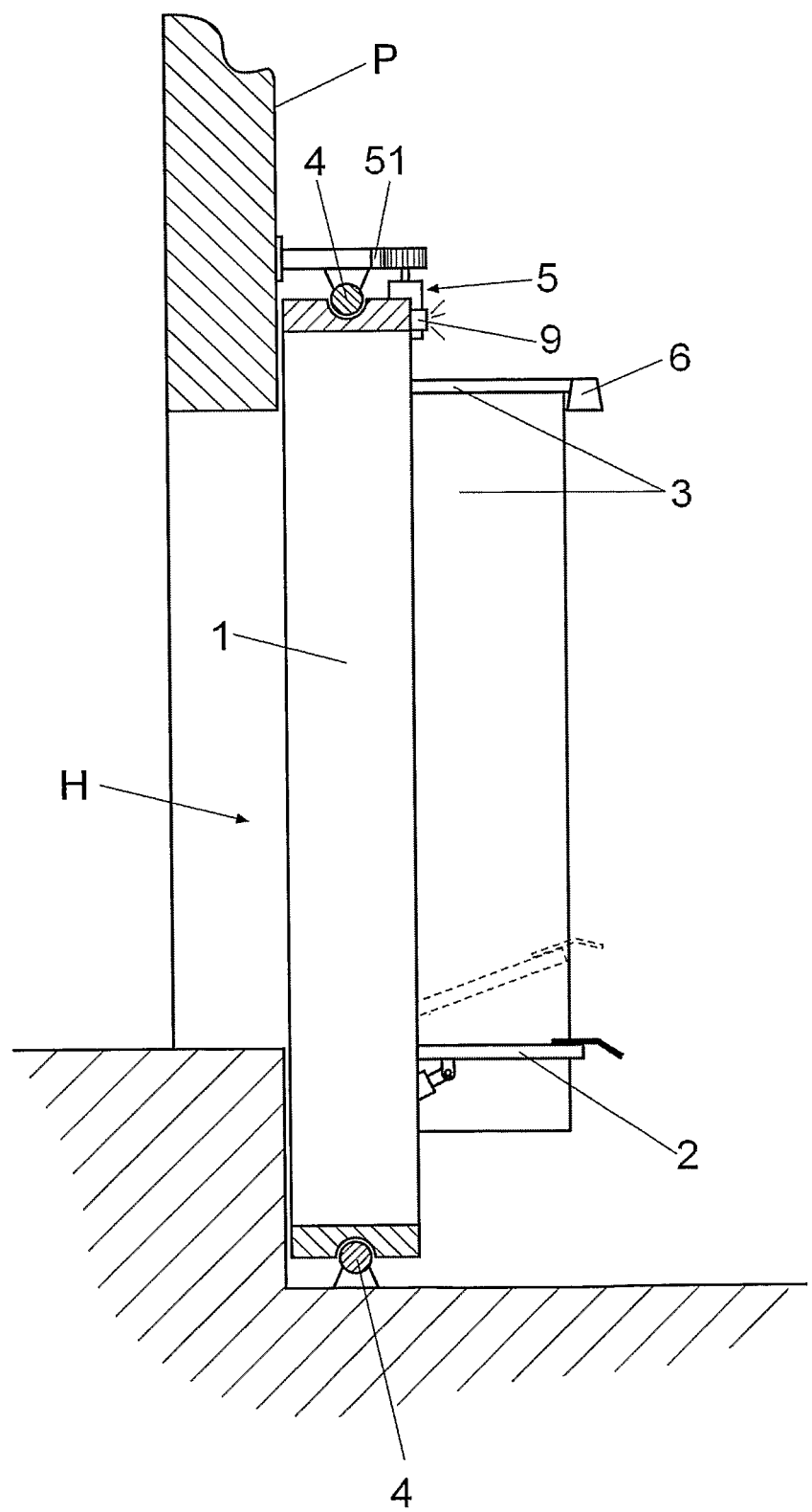
FIG. 2 shows a side view of the loading bay in the previous diagram.

In the use shown in FIGS. 1 and 2, the bar of sensors (6) is set on the free side of the fold-away roof of the shelter (3), moving with the compact structure (1) along the guides (4).

In this use, the bar of sensors activates the light-signaling device (7) adjoined to the compact structure (1) itself.

Figure 3:
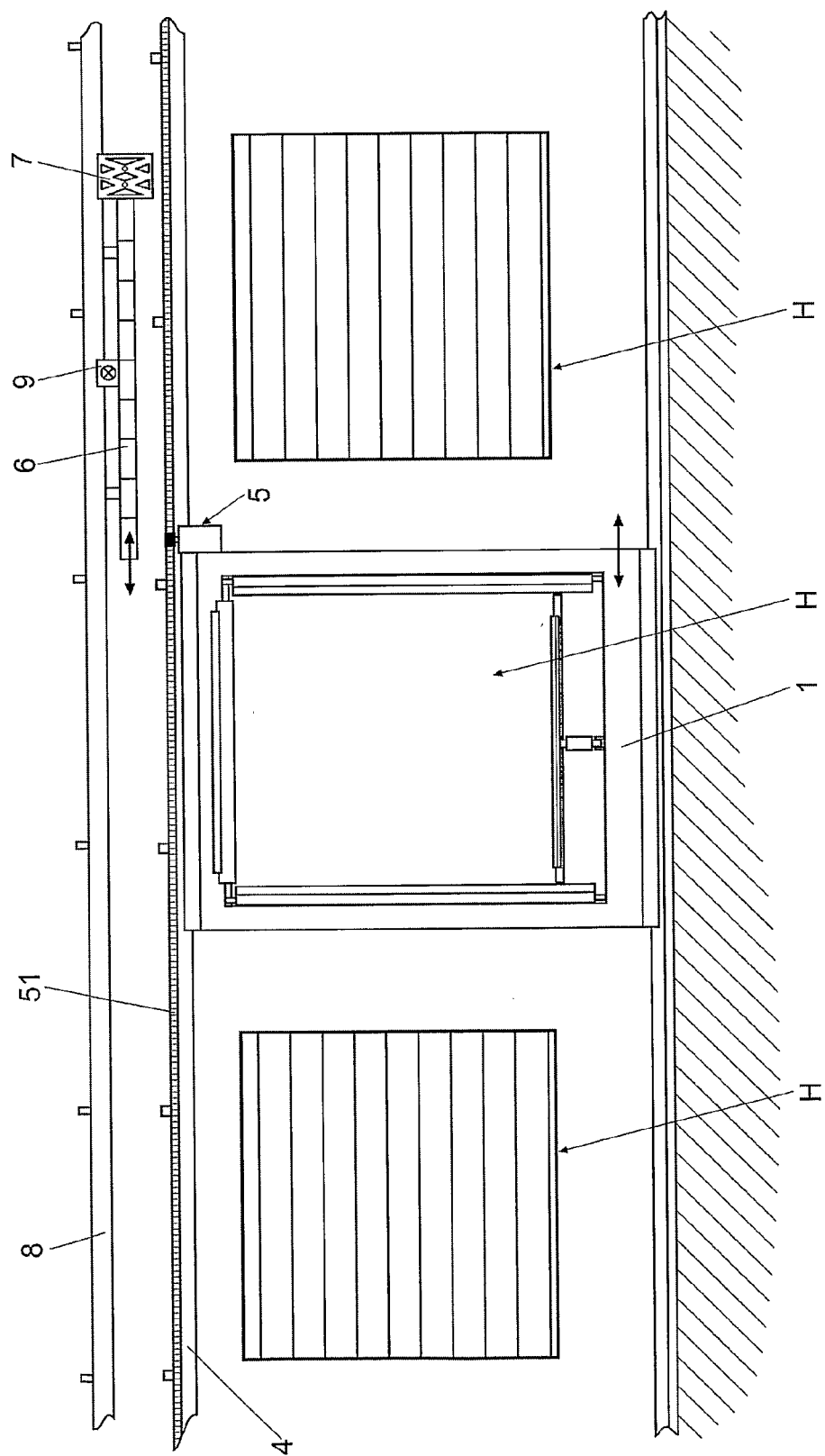
FIG. 3 shows a schematic view from above of an example of use of the loading bay opposite one of the openings to a shed, and with the bar of sensors set on specific guide means for independent displacement.
Figure 4:
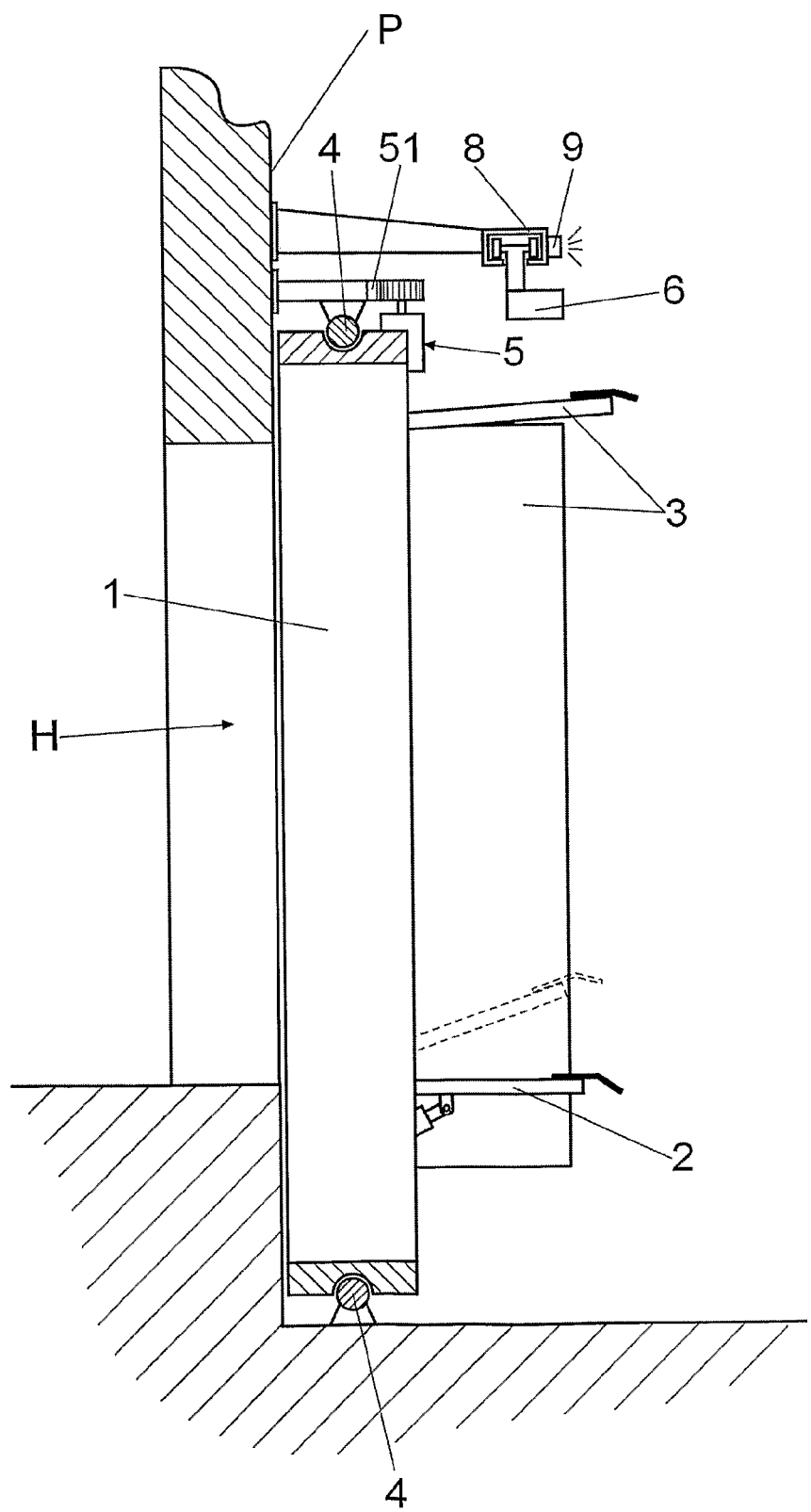
FIG. 4 shows a side view of FIG. 3.

In a variation of use shown in FIGS. 3 and 4, the bar of sensors (6) is set on specific longitudinal guide means (8), which are different to the guides (4) for moving the compact structure (1).

This enables the bar of sensors (6) to have a different opening (H) to that in which the compact structure (1) is located. Through the light-signaling device (7) associated in this case to the bar of sensors (6), necessary information is provided to help the truck move closer to the opening correctly while the loading bay is being used in a different opening for loading or unloading another truck.

In the example of use shown in the figures attached, the loading bay has a light and/or acoustic signal (9) warning of the approach of the truck to any people who may be in the area where the truck needs to maneuver to get close to the opening, where the bar of sensors (6) is located, and the signal (9) can also detect presence for the safety of people.

Given its moveable character, when it is in any of the openings (H), the loading bay closes the perimeter with the truck and the shelter (3) and the corresponding opening, which can include, to this effect, flexible joints in its perimeter.

Figure 5:
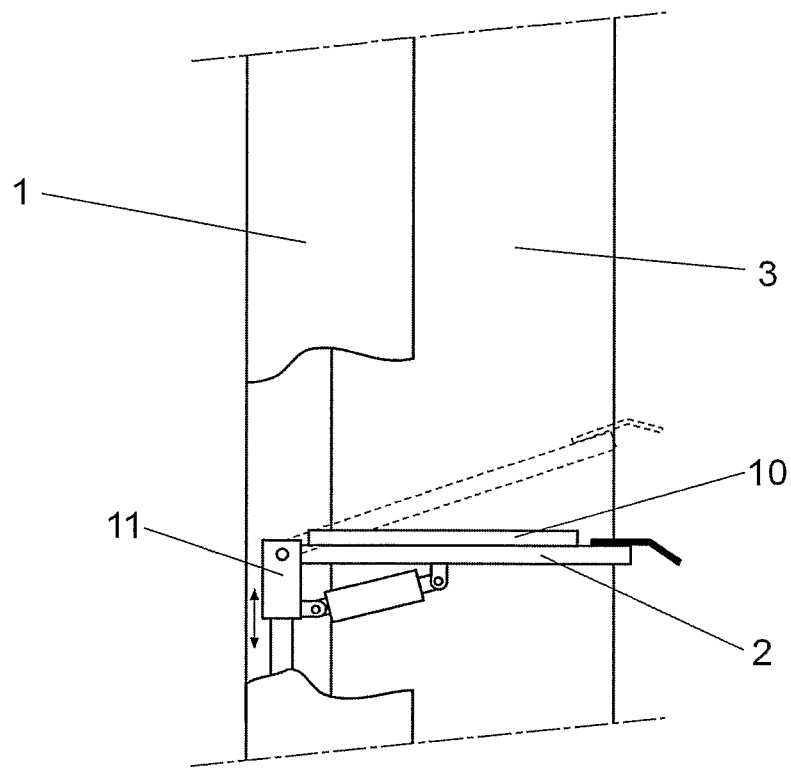
FIG. 5 shows a partial cross-section of an example of use of the loading bay, with the fold-away ramp set on the compact structure with the possibility of being moved vertically.

In the example of use shown in FIG. 5, the fold-away ramp is set on the compact structure (1) using raising devices (11), represented schematically by cylinders which make it possible to move vertically on the compact structure (1) and adjust the height for vehicles of different types and/or sizes.

As shown in FIG. 5, the fold-away ramp (2) comprises side stops (10) in the surface area on the side, which define the area through which trolleys can pass, avoiding possible falls towards the exterior of the shed.

Figure 6:
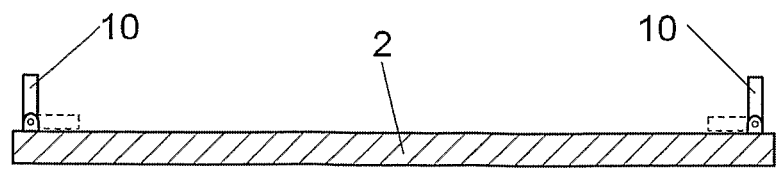
FIG. 6 shows a front view of an example of use with the fold-away ramp with side stops to define the zone for trolleys to pass through. The side stops are represented by an unbroken line in the position of use and a broken line in the down or inoperative position.

The side stops (9) can be fixed as shown in the aforementioned FIG. 5, or fold away as shown in FIG. 6, where they are represented by an unbroken line in the operative position and a broken line in the down position on the ramp.

Having described in sufficient detail the nature of the invention, and provided an example of preferential use, it is stated for relevant purposes that the materials, shape, size and arrangement of the elements described can be modified, as long as they do not suppose an alteration of the essential features of the invention which are outlined below.

The invention claimed is:

1. A loading bay for placement between a building that has a plurality of spaced openings body, the loading bay comprising:
   a compact structure carrying: (1) at least one fold-away ramp designed to connect the building and the truck box body and (2) a shelter for closing off a the space between the building and the truck box body at a side and at a top during loading or unloading operations;
   a first longitudinal guide mechanism for placement longitudinally relative to a wall of the building, the guide mechanism includes a first section about which a bottom of the compact structure travels in a longitudinal direction along the wall and a second section about which a top of the compact structure travels in the longitudinal direction the first longitudinal guide mechanism further including an actuator that is fixedly attached to the wall and engages the first section for controllably driving the compact structure in the longitudinal direction to allow placement of the compact structure opposite any one of the openings in the building,
   wherein the compact structure carrying the ramp and the shelter adjoins the wall of the building on an outside thereof to allow positioning opposite one opening in the building.

2. Loading bay, according to claim 1, wherein the actuator comprises a motorised actuator that intimately engages a rack disposed longitudinally along the first section of the guide mechanism.

3. Loading bay, according to claim 1, further comprising:
   at least one bar of sensors for detecting the position of the truck box body while said truck box body is being moved closer into position in the opening of the building and a control device with at least one light-signalling device that provides a driver of the truck box body with information about a the position of the truck box body as the truck box body is being moved closer into position in one of the openings.

4. Loading bay, according to claim 1, further including a signalling device comprising at least one of a light signal and an acoustic signal for warning any person in a dangerous area of an approach of the truck box body into an loading/unloading area opposite the opening.

5. Loading bay, according to claim 4, wherein the bar of sensors is set on a free side of a fold-away roof of the shelter, and the signalling device is coupled to and supported by the compact structure itself, and therefore the bar of sensors and the signalling device move with the compact structure along the first longitudinal guide mechanism, thereby allowing placement proximate to one opening.

6. Loading bay, according to claim 4, wherein the bar of sensors and the signalling device are coupled to a second longitudinal guide mechanism that extends longitudinally along the wall of the building spaced from the first longitudinal guide mechanism, the bar of sensors and the signalling device moving longitudinally on the second longitudinal guide mechanism for positioning opposite any one of the different openings in the building.

7. Loading bay, according to claim 3, wherein the bar of sensors is illuminated by adequate light so that it is visible at night and in adverse weather conditions.

8. Loading bay, according to claim 1, wherein the compact structure includes the shelter closes a perimeter interface between the truck box body and the corresponding opening.

9. Loading bay, according to claim 1, wherein the fold-away ramp is set on the compact structure through raising means which make it possible to move vertically in relation to the compact structure and adjust in height to vehicles of different types and/or sizes, the fold-away ramp moving longitudinally with the compact structure.

10. Loading bay, according to claim 1, wherein the fold-away ramp includes side stops on sides of a surface of the ramp through which trolleys can pass, the side stops defining the surface longitudinally, avoiding possible falls from this area to an exterior side of the building.

11. Loading bay, according to claim 10, wherein the side stops are set on the fold-away ramp and are configured to turn between an operative position, slightly perpendicular to the surface of the fold-away ramp, and an inoperative position, slightly parallel to the surface of the fold-away ramp.

* * * * *